United States Patent [19]

Rehfuss et al.

[11] Patent Number: 5,373,069
[45] Date of Patent: Dec. 13, 1994

[54] CURABLE CARBAMATE-FUNCTIONAL POLYMERS

[75] Inventors: John W. Rehfuss, West Bloomfield; Walter H. Ohrbom, Southfield, both of Mich.

[73] Assignee: BASF Corporation

[21] Appl. No.: 98,169

[22] Filed: Jul. 28, 1993

[51] Int. Cl.$^5$ .......................................... C08F 283/04
[52] U.S. Cl. .................................... 525/456; 525/440; 525/452; 525/453; 525/459
[58] Field of Search ............... 525/440, 452, 453, 456, 525/459

[56] References Cited

U.S. PATENT DOCUMENTS

| | | | |
|---|---|---|---|
| 3,479,328 | 11/1969 | Nordstrom | 260/86.1 |
| 3,674,838 | 7/1972 | Nordstrom | 260/482 C |
| 4,100,143 | 7/1978 | Wolf et al. | 526/301 |
| 4,126,747 | 11/1978 | Cowherd, III et al. | 520/166 |
| 4,239,866 | 12/1980 | Reitel et al. | 525/440 |
| 4,279,833 | 7/1981 | Culbertson et al. | 260/464 |
| 4,340,497 | 7/1982 | Knopf | 252/188.3 |
| 4,543,276 | 9/1985 | Parekh | 427/388.3 |
| 4,581,430 | 4/1986 | Phan et al. | |
| 4,758,632 | 7/1988 | Parekh et al. | |
| 4,820,830 | 4/1989 | Blank | 560/188 |
| 4,942,215 | 7/1990 | Greco et al. | 528/114 |
| 5,134,205 | 7/1992 | Blank | 525/509 |

FOREIGN PATENT DOCUMENTS

| | | | |
|---|---|---|---|
| 912563 | 12/1962 | United Kingdom | 544/221 |
| 974900 | 11/1964 | United Kingdom | 544/221 |

OTHER PUBLICATIONS

John W. Rehfuss, "Composite Color-Plus-Clear Coating Utilizing Carbamate-Functional Polymer Composition in the Clearcoat", Oct. 23, 1992 (07/965,577).
John W. Rehfuss, "Curable Carbamate-Functional Polymer Composition", Oct. 23, 1992, (07/965,509).
John W. Rehfuss; Tri-Combamate-Functional Crosslinking Agents; Apr. 30, 1993 pp. 1–17; 08/056,514.

*Primary Examiner*—James J. Seidleck
*Assistant Examiner*—Mary Critharis
*Attorney, Agent, or Firm*—Paul L. Marshall

[57] ABSTRACT

Curable compositions are disclosed comprising:
(A) a carbamate-functional polymer that is the reaction product of a mixture comprising:
  (1) a polymer that is the reaction product of a mixture comprising:
    (a) a polyisocyanate and
    (b) an active hydrogen-containing chain extension agent, and
  (2) a compound comprising a group that is reactive with said polymer (A) (1) and a carbamate group or group that can be converted to carbamate, and
(B) a compound having a plurality of functional groups that are reactive with carbamate groups on said carbamate-functional polymer.

13 Claims, No Drawings

CURABLE CARBAMATE-FUNCTIONAL POLYMERS

FIELD OF THE INVENTION

This invention relates to curable compositions containing polymers, especially coating compositions.

BACKGROUND OF THE INVENTION

Polyurethanes and polyureas are known to be useful in curable compositions. They are typically prepared by reacting a polyisocyanate and an active hydrogen-containing chain extension agent. The polyurethane or polyurea is often capped with a polyol or reacted with excess polyol chain extension agent to provide it with a terminal hydroxyl group. This hydroxyl provides an active hydrogen that serves as a functional group to react with a curing agent such as an aminoplast resin. Other capping agents that will provide an active hydrogen functional group include amines, alcohol amines, and water.

It is often desireable for curable compositions to possess a variety of performance characteristics. These characteristics include good cohesiveness, strong adhesiveness to a variety of other materials, hardness, flexibility, scratch resistance, mar resistance, and the like. For coating compositions, especially for exterior coatings and most especially for clearcoats such as automotive clearcoats, resistance to attack by a variety of environmental elements, such as solvents, gasoline, water, salts, acids, heat, and UV radiation, are also desireable. While curable compositions based on hydroxy-capped polyurethanes or polyureas and melamine curing agents possess many desirable characteristics, they often do not provide an optimimum combination of the above performance charasterics as may be desired.

SUMMARY OF THE INVENTION

The present invention provides curable compositions comprising:
(A) a carbamate-functional polymer that is the reaction product of a mixture comprising:
   (1) a polymer that is the reaction product of a mixture comprising:
      (a) a polyisocyanate and
      (b) an active hydrogen-containing chain extension agent, and
   (2) a compound comprising a group that is reactive with said polymer (A)(1) and a carbamate group or group that can be converted to carbamate, and
(B) a compound having a plurality of functional groups that are reactive with carbamate groups on said carbamate-functional polymer.

These curable compositions may be used for a variety of applications, such as coatings, castings, and moldings. When used for coatings, for example, they provide durable hard coatings exhibiting many of the above desirable characteristics for exterior coatings, especially automotive clearcoats.

DESCRIPTION OF THE PREFERRED EMBODIMENTS

Polyurethane and polyurea polymers are well-known in the art. The polyurethanes are the reaction product of a polyol and an active hydrogen-containing chain extension agent.

The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and paraxylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha,\alpha,\alpha'$-,$\alpha'$-tetramethyl xylylene diisocyanate can be used. Also useful as the polyisocyanate are isocyanurates such as DESMODUR ® 3300 from Mobay and biurets of isocyanates such as DESMODUR ® N100 from Mobay.

Active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. For purposes of this aspect of the invention both primary and secondary amine groups are considered as having one active hydrogen. Active hydrogen-containing chain extension agents also include water. In a preferred embodiment of the invention, a polyol is used as the chain extension agent, and the polymer (A)(1) is a polyurethane. In an especially preferred embodiment, a diol is used as the chain extension agent with little or no higher polyols, so as to minimize branching. Examples of preferred diols which are used as polyurethane chain extenders include 1,6 hexanediol, cyclohexanedimethylol, and 1,4-butanediol. While polyhydroxy compounds containing at least three hydroxyl groups may be used as chain extenders, the use of these compounds produces branched polyurethane resins. These higher functional polyhydroxy compounds include, for example, trimethylolpropane, trimethylolethane, pentaerythritol, among other compounds.

The polymer may be chain extended in any manner using these compounds having at least two active hydrogen groups. Thus, these compounds may be added to the mixture of polyisocyanate, polyol, and multifunctional compound, or alternatively, may react at an intermediate stage, to link two free isocyanate groups that are present at the terminal ends of an intermediate polymer.

Polymeric chain extension agents can also be used, such as polyester polyols, polyether polyols, polyurethane polyols, or polymeric amino group-containing polymers, as is known in the art. Mixtures of any of the above chain extension agents can also be used.

The reaction of the polyisocyanate and polyol is conducted by heating the components in a suitable reaction medium such as xylene or propylene glycol monoethylether acetate. The use of catalysts for this reaction, e.g., organotin catalysts such as dibutyltin diacetate, is well-known in the art. The degree of polymerization is controlled by the duration of the maintenance of the elevated temperature reaction conditions. Polymers useful as the polymer (A)(1) of the present invention may have a number average molecular weight of from 600 to 6000 are useful in the practice of the present invention. Various groups, such as nonionic polyether stabilizing groups, ionic stabilizing groups (e.g., carboxyl groups), unsaturated bond groups, and the like may be incorporated or appended to the polymer, as is known in the art.

The polymer (A)(1) used in the practice of the present invention contains one or more functional groups for reaction with component (A)(2). Examples of these groups include isocyanate groups, hydroxyl groups, epoxy groups, unsaturated double bonds, carboxylic acid groups, and ketals. In a preferred embodiment, the functional group on the polymer (A)(1) is a terminal isocyanate group. The presence of isocyanate active hydrogen terminal groups (e.g., hydroxyl) may be controlled by the molar ratio of active hydrogen:NCO in the reaction mixture. A ratio of greater than 1 will tend to provide active hydrogen-terminated polymers. A ratio of less than 1 will tend to provide isocyanate-terminated polymers.

The functional groups on the polymer (A)(1) may be terminal groups or they may be pendant groups. Active hydrogen or isocyanate terminal groups may be provided by adjusting the stoichiometry of the chain extension agent and polyisocyanate in the reaction mixture. Other terminal groups may be provided by the use of capping agents. For example, an acid terminal group can be provided by capping the polymer with a hydroxyacid. Pendant functional groups may be provided by using chain extension agents having two active hydrogen groups and the desired functional group, e.g., dimethanol propionic acid, as is well-known in the art.

The compound (A)(2) has a group that is reactive with the functional group on the polymer (A)(1), and also has either a carbamate group or a group that is capable of forming a carbamate group. Groups that are capable of forming a carbamate group include cyclic carbonate groups, epoxide groups, and unsaturated double bond groups. Cyclic carbonate groups can be converted to carbamate groups by reaction with ammonia. Epoxide groups can be converted to carbamate by reaction with $CO_2$ and then ammonia. Unsaturated double bond groups can be converted to carbamate by reaction with peroxide, then $CO_2$ and ammonia.

The group on compound (A)(2) that reacts with the polymer (A)(1) depends on the specific functional group on the polymer with which the reaction is to take place. If the polymer's functional group is an isocyanate group, the group on compound (A)(2) is preferably an active hydrogen-containing group such as hydroxyl or amino. For example, an isocyanate group on the polymer can be reacted with a hydroxyalkyl carbamate, or with a hydroxy-containing epoxide with the epoxy group subsequently converted to carbamate by reaction with $CO_2$ and then ammonia. If the polymer's functional group is hydroxyl, the reactive group on the (A)(2) group may be oxygen of the COO portion of the carbamate group on an alkyl carbamate or methylol, such as with methylol acrylamide ($HO-CH_2-NH-CO-CH=CH_2$). In the case of the COO group on an alkyl carbamate, the hydroxyl group on the polymer undergoes a transesterification with the COO group, resulting in the carbamate group being appended to the polymer. In the case of methylol acrylamide, the unsaturated double bond is then reacted with peroxide, $CO_2$, and ammonia as described above. If the functional group on the polymer is a carboxyl group, the acid group can be reacted with epichlorohydrin to form a monoglycidyl ester, which can be converted to carbamate by reaction with $CO_2$, and then ammonia. Alternatively, an acid-functional group on the polymer can be reacted with acetic anhydride to generate an anhydride, which can then be reacted with a compound having an active hydrogen group such as hydroxyl and a carbamate group or group that can be converted to carbamate.

In a preferred embodiment, the compound (A)(2) contains a group that is reactive with NCO on the polymer (A)(1) and a group that can be converted to carbamate. Examples of these compounds include active hydrogen-containing cyclic carbonate compounds (e.g., the reaction product of glycidol and $CO_2$) that are convertible to carbamate by reaction with ammonia, monoglycidyl ethers (e.g., Cardura E ®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia. Any of the above compounds can be utilized as compounds containing carbamate groups rather than groups convertible to carbamate by converting the group to carbamate prior to reaction with the polymer.

In another preferred embodiment, the compound (A)(2) contains a carbamate group and a group that is reactive with NCO on the polymer (A)(1). Examples of compounds containing a carbamate group and a group that is reactive with NCO include hydroxyethyl carbamate and hydroxypropyl carbamate.

The composition of the invention is cured by a reaction of the polymer (A) with a compound (B) that is a compound having a plurality of groups that are reactive with the carbamate groups on (A). Such reactive groups include active methylol or methylalkoxy groups on aminoplast crosslinking agents or on other compounds such as phenol/formaldehyde adducts, acrylamide groups, isocyanate groups, siloxane groups, cyclic carbonate groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polymers having acrylamide groups, polymers having methylol or alkoxymethyl groups, polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. patent application Ser. No. 07/965,510 entitled "Carbamate-Defunctionalized Aminoplast Curing for Polymer Compositions" in the names of John W. Rehfuss and Donald L. St. Aubin.

A solvent may optionally be utilized in the curable composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the urea-functional component (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of aqueous co-solvents.

The curable composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the composition of the invention is utilized as a coating composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

The coating composition according to the present invention may be clear, or it may include a pigment as is well-known in the art. In a preferred embodiment, the coating composition is the clearcoat of a color-plus-clear composite coating.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The composition of the invention is generally heat-cured by exposing it to elevated temperatures. Curing temperatures will vary depending on the particular blocking groups used in the cross-linking agents, however they generally range between 93° C. and 177° C., and are preferably between 121° C. and 141° C. The curing time will vary depending on the particular components used, and physical parameters such as the thickness of the layers (in the case of a coating). Typical curing times for coatings range from 15 to 60 minutes.

The invention is further described in the following examples.

EXAMPLE 1

A reactor, charged with 102.9 parts propylene glycol monomethyl ether acetate, 27.2 parts toluene and 34.3 parts 2-ethyl-1,3-hexanediol was heated under inert atmosphere to reflux (140° C. to 143° C.). Once at reflux, the inert atmosphere was turned off and 22.6 parts of the refluxed reaction mixture was removed. The reaction mixture was then cooled under inert atmosphere to below 35° C. and 56.4 parts of hydroxypropyl carbamate was added. The mixture was heated to 45° C., and 0.2 parts of dibutyl tin dilaurate was added. The mixture was then heated to 60° C. 100.2 parts of isophorone diisocyanate was then added over a 20-minute period. The reaction mixture was allowed to exotherm to 70° C. The system was then held at 70° C. for one hour, then 80° C. until the reaction mixture had an NCO equivalent weight of over 40,000 g/eq (soln). 10 parts of n-butanol was then added. The product had a solids content of 64.2%, a theoretical non-volatile carbamate equivalent weight of 435.9 g/eq, number average molecular weight of 1200 Daltons, and a weight average molecular weight of 1565 Daltons.

13.7 g of this product was combined with 4.1 g of a melamine formaldehyde resin having 50% of the functional groups blocked with butyl carbamate, and 0.06 g dodecyl benzene sulfonic acid to form an 84.5% non-volatiles composition. The system was reduced to 50% nonvolatiles with propylene glycol monomethyl ether acetate, and drawn down 8 mm on a glass substrate. The composition was then cured at 141° C. for 30 minutes to form a hard, clear, smooth colorless film that passed 200 methyl ethyl ketone double rubs.

The invention has been described in detail with reference to preferred embodiments thereof. It should be understood, however, that variations and modifications can be made within the spirit and scope of the invention.

What is claimed is:

1. A curable coating composition comprising:
(A) a carbamate-functional polymer that is the reaction product of a mixture comprising:
   (1) a polymer that is the reaction product of a mixture comprising:
      (a) a polyisocyanate and
      (b) an active hydrogen-containing chain extension agent, and (2) a compound having a group that is reactive with said polymer (A)(1) and a carbamate group or group that can be converted to carbamate, and (B) a compound having a plurality of functional groups that are reactive with carbamate groups on said carbamate-functional polymer.

2. A curable coating composition according to claim 1 wherein the polymer (A)(1) is terminated with isocyanate groups, and the compound (A)(2) has a group that is reactive with isocyanate and a carbamate group or group that can be converted to carbamate.

3. A curable coating composition according to claim 2 wherein the compound (A)(2) is a carbamate compound having an active hydrogen group.

4. A curable coating composition according to claim 3 wherein the compound (A)(2) is a hydroxyalkyl carbamate.

5. A curable coating composition according to claim 3 wherein the compound (A)(2) is a hydroxyalkyl cyclic carbonate.

6. A curable coating composition according to claim 1 wherein the polymer (A)(1) has a number average molecular weight of 600 to 6000.

7. A curable coating composition according to claim 1 wherein the polymer (A)(1) is a polyurethane that is the reaction product of a polyisocyanate and a polyol.

8. A curable coating composition according to claim 1 wherein the polymer (A)(1) is a linear polyurethane that is the reaction product of a diisocyanate and a diol.

9. A curable coating composition according to claim 1 wherein the compound B is an aminoplast.

10. A curable coating composition according to claim 9 wherein the aminoplast is a melamine formaldehyde resin.

11. A curable coating composition according to claim 9 wherein the aminoplast is a urea formaldehyde resin.

12. A color-plus-clear composite coating wherein the clear coating is derived from a curable coating composition according to any of claims 1–11.

13. A curable composition comprising:

(A) a carbamate-functional polymer that is the reaction product of a mixture comprising:
  (1) a polymer that is the reaction product of a mixture comprising:
    (a) a polyisocyanate and
    (b) an active hydrogen-containing chain extension agent, and
  (2) a compound having a group that is reactive with said poyurethane and a carbamate group or group that can be converted to carbamate, and (B) a compound having a plurality of functional groups that are reactive with carbamate groups on said carbamate-functional polymer.

* * * * *

Adverse Decisions in Interference

Patent No. 5,373,069, John W. Rehfuss, Walter H. Ohrbom, CURABLE CARBAMATE-FUNCTIONAL POLYMERS, Interference No. 103,798, final judgment adverse to patentees rendered February 18, 1998, as to claims 1-13.

*(Official Gazette April 21, 1998)*